(12) United States Patent
Kamigaki et al.

(10) Patent No.: US 7,432,314 B2
(45) Date of Patent: Oct. 7, 2008

(54) FUNCTIONAL MATERIAL, DISPERSION CONTAINING THE FUNCTIONAL MATERIAL, AND PROCESS FOR PRODUCING THE FUNCTIONAL MATERIAL

(75) Inventors: Mamoru Kamigaki, Hatsukaichi (JP); Hiroko Morii, Hiroshima (JP); Kazuyuki Hayashi, Hiroshima (JP); Toru Iwaki, Higashihiroshima (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 2 days.

(21) Appl. No.: 10/319,849

(22) Filed: Dec. 16, 2002

(65) Prior Publication Data

US 2003/0199608 A1    Oct. 23, 2003

(30) Foreign Application Priority Data

Dec. 18, 2001    (JP)    ............... 2001-385254

(51) Int. Cl.
*C09D 11/00*    (2006.01)
(52) U.S. Cl. .............. 523/160; 523/161; 523/200; 523/210
(58) Field of Classification Search ........ 523/200, 523/210, 160, 161; 524/425, 430, 492
See application file for complete search history.

(56) References Cited

U.S. PATENT DOCUMENTS

| | | | | |
|---|---|---|---|---|
| 6,440,561 | B2 * | 8/2002 | Hayashi et al. | ............. 428/407 |
| 6,596,071 | B2 * | 7/2003 | Hayashi et al. | ............. 106/445 |
| 6,695,898 | B2 * | 2/2004 | Momose | ................. 106/31.43 |
| 6,720,007 | B2 * | 4/2004 | Walt et al. | ................... 424/489 |
| 2002/0069790 | A1 * | 6/2002 | Hayashi et al. | ............. 106/482 |
| 2003/0116758 | A1 * | 6/2003 | Morii et al. | ................. 252/582 |

FOREIGN PATENT DOCUMENTS

| | | | |
|---|---|---|---|
| EP | 1 184 426 A2 | 3/2002 |
| EP | 1 264 866 A2 | 12/2002 |

OTHER PUBLICATIONS

Patent Abstracts of Japan, vol. 2000, No. 1, Jan. 31, 2000 & JP 11 269432 A, Oct. 5, 1999.

* cited by examiner

*Primary Examiner*—Edward J Cain
(74) *Attorney, Agent, or Firm*—Nixon & Vanderhye P.C.

(57) ABSTRACT

A functional material comprising fine coloring particles having an average primary particle diameter of 1 to 50 nm in a dried state, and having a BET specific surface area value of 30 to 500 m²/g and a light transmittance of not less than 80%. The functional material composed of fine coloring particles, exhibits not only an excellent transparency but also a high tinting strength and a clear hue.

6 Claims, No Drawings

US 7,432,314 B2

FUNCTIONAL MATERIAL, DISPERSION CONTAINING THE FUNCTIONAL MATERIAL, AND PROCESS FOR PRODUCING THE FUNCTIONAL MATERIAL

BACKGROUND OF THE INVENTION

The present invention relates to a functional material, a dispersion containing the functional material, and a process for producing the functional material. More particularly, the present invention relates to a functional material composed of fine coloring particles, which exhibits not only an excellent transparency but also a high tinting strength and a clear hue, a dispersion containing the functional material, and a process for producing the functional material.

As well known in the art, organic pigments have been used as colorants for paints, resins, printing inks or the like according to applications thereof. Therefore, the organic pigments have been generally required to have a high tinting and a good transparency.

The organic pigments are produced by first forming fine primary particles having a particle size as small as about 20 to 100 nm from the pigments in a molecular state produced by a chemical reaction, and then subjecting the thus obtained primary particles to filtering, washing and drying steps. However, the fine primary particles tend to be agglomerated because of a very high surface energy thereof, thereby forming aggregates (secondary particles). It is well known that the formation of the secondary particles remarkably proceeds, in particular, upon the drying step.

The organic pigments in the form of fine coloring particles have a possibility of exhibiting novel functions. Therefore, it has been expected that the organic pigments are used in other applications than pigments, for example, as nonlinear optical materials.

As the method for producing such fine coloring particles, there are known, for example, a method of applying an ultrasonic wave to a liquid dispersion containing fine functional particles dispersed therein to inhibit agglomeration thereof (Japanese Patent Application Laid-open No. 11-269432 (1999)); and a method of producing fine coloring particles of an organic compound by irradiating a laser beam to the organic compound (Japanese Patent Application Laid-open No. 2001-113159).

However, in any of these conventional methods, it may be difficult to obtain fine coloring particles having a primary particle diameter of not more than 50 nm. At present, it has been strongly required to provide fine coloring particles having a high tinting strength as well as an excellent transparency and a clear hue. However, the conventional methods have failed to obtain such fine coloring particle satisfying the above properties.

As a result of the present inventors' earnest studies, it has been found that by mixing inorganic compound particles with a gluing agent under stirring to form a gluing agent coat on the surface of the inorganic compound particles, mixing organic pigments with the obtained inorganic compound particles coated with the gluing agent under stirring to adhere the organic pigments onto the surface of the gluing agent coat, thereby obtaining composite particles, and then dissolving either the inorganic compound particles as core particles only or both of the inorganic compound particles and the gluing agent from the composite particles, the obtained functional material composed of fine coloring particles have a fine primary particle diameter, and can exhibit a high tinting strength as well as an excellent transparency and a clear hue. The present invention has been attained on the basis of this finding.

SUMMARY OF THE INVENTION

An object of the present invention is to provide a functional material composed of fine coloring particles having a fine primary particle diameter, which exhibits a high tinting strength as well as an excellent transparency and a clear hue.

Another object of the present invention is to provide a dispersion exhibiting an excellent transparency and a clear hue.

To accomplish the aims, in a first aspect of the present invention, there is provided a functional material comprising fine coloring particles having an average primary particle diameter of 1 to 50 nm in a dried state, and having a BET specific surface area value of 30 to 500 $m^2/g$ and a light transmittance of not less than 80% when evaluated by the following method:

(1) blending 5 g of the functional material and the following components as a paint base material at the below-mentioned mixing ratio in a 250 ml glass bottle, and mixing and dispersing the resultant mixture together with 160 g of 3 mmφ glass beads using a paint shaker for 120 minutes, thereby preparing a paint:

| Functional material | 9.9 parts by weight |
| Melamine resin | 19.8 parts by weight |
| Alkyd resin | 39.6 parts by weight |
| Xylene | 29.7 parts by weight |
| Butanol | 1.0 part by weight; |

(2) applying the thus prepared paint onto a 100 μm-thick clear film to form a coating film having a thickness of 150 μm thereon; and (3) measuring a light transmittance of the obtained coating film in a wavelength region of 380 to 700 nm using a self-recording photoelectric spectrophotometer.

In a second aspect of the present invention, there is provided a functional material comprising fine coloring particles having an average primary particle diameter of 1 to 50 nm in a dried state, and having a BET specific surface area value of 30 to 500 $m^2/g$ and a light transmittance of not less than 80% when evaluated by the following method:

(1) blending 5 g of the functional material and the following components as a paint base material at the below-mentioned mixing ratio in a 250 ml glass bottle, and mixing and dispersing the resultant mixture together with 160 g of 3 mmφ glass beads using a paint shaker for 120 minutes, thereby preparing a paint:

| Functional material | 9.9 parts by weight |
| Melamine resin | 19.8 parts by weight |
| Alkyd resin | 39.6 parts by weight |
| Xylene | 29.7 parts by weight |
| Butanol | 1.0 part by weight; |

(2) applying the thus prepared paint onto a 100 μm-thick clear film to form a coating film having a thickness of 150 μm thereon; and (3) measuring a light transmittance of the obtained coating film in a wavelength region of 380 to 700 nm using a self-recording photoelectric spectrophotometer, which is produced by a process comprising: mixing inorganic compound particles with a gluing agent under stirring to form a gluing agent coat on surface of the inorganic compound particles;

adding organic pigments to the inorganic compound particles coated with the gluing agent, and mixing the resultant mixture under stirring to adhere the organic pigments on the gluing agent coat, thereby obtaining composite particles; and dissolving the inorganic compound particles only or both of the inorganic compound particles and the gluing agent from the composite particles.

In a third aspect of the present invention, there is provided a dispersion comprising:

a functional material comprising fine coloring particles having an average primary particle diameter of 1 to 50 nm in a dried state, and having a BET specific surface area value of 30 to 500 m$^2$/g and a light transmittance of not less than 80% when evaluated by the following method:

(1) blending 5 g of the functional material and the following components as a paint base material at the below-mentioned mixing ratio in a 250 ml glass bottle, and mixing and dispersing the resultant mixture together with 160 g of 3 mmφ glass beads using a paint shaker for 120 minutes, thereby preparing a paint:

| Functional material | 9.9 parts by weight |
|---|---|
| Melamine resin | 19.8 parts by weight |
| Alkyd resin | 39.6 parts by weight |
| Xylene | 29.7 parts by weight |
| Butanol | 1.0 part by weight; |

(2) applying the thus prepared paint onto a 100 μm-thick clear film to form a coating film having a thickness of 150 μm thereon; and (3) measuring a light transmittance of the obtained coating film in a wavelength region of 380 to 700 nm using a self-recording photoelectric spectrophotometer; and a dispersion base material comprising water, a mixture of water and a water-soluble organic solvent, or an organic solvent, said functional material being contained in an amount of 5 to 1,000 parts by weight based on 100 parts by weight of the dispersion base material.

In a fourth aspect of the present invention, there is provided a resin composition comprising:

a functional material comprising fine coloring particles having an average primary particle diameter of 1 to 50 nm in a dried state, and having a BET specific surface area value of 30 to 500 m$^2$/g and a light transmittance of not less than 80% when evaluated by the following method:

(1) blending 5 g of the functional material and the following components as a paint base material at the below-mentioned mixing ratio in a 250 ml glass bottle, and mixing and dispersing the resultant mixture together with 160 g of 3 mmφ glass beads using a paint shaker for 120 minutes, thereby preparing a paint:

| Functional material | 9.9 parts by weight |
|---|---|
| Melamine resin | 19.8 parts by weight |
| Alkyd resin | 39.6 parts by weight |
| Xylene | 29.7 parts by weight |
| Butanol | 1.0 part by weight; |

(2) applying the thus prepared paint onto a 100 μm-thick clear film to form a coating film having a thickness of 150 μm thereon; and (3) measuring a light transmittance of the obtained coating film in a wavelength region of 380 to 700 nm using a self-recording photoelectric spectrophotometer; and a thermoplastic resin, said functional material being contained in an amount of 0.01 to 200 parts by weight based on 100 parts by weight of the thermoplastic resin.

In a fifth aspect of the present invention, there is provided an ink-jet printing ink comprising:

a functional material comprising fine coloring particles having an average primary particle diameter of 1 to 50 nm in a dried state, and having a BET specific surface area value of 30 to 500 m$^2$/g and a light transmittance of not less than 80% when evaluated by the following method:

(1) blending 5 g of the functional material and the following components as a paint base material at the below-mentioned mixing ratio in a 250 ml glass bottle, and mixing and dispersing the resultant mixture together with 160 g of 3 mmφ glass beads using a paint shaker for 120 minutes, thereby preparing a paint:

| Functional material | 9.9 parts by weight |
|---|---|
| Melamine resin | 19.8 parts by weight |
| Alkyd resin | 39.6 parts by weight |
| Xylene | 29.7 parts by weight |
| Butanol | 1.0 part by weight; |

(2) applying the thus prepared paint onto a 100 μm-thick clear film to form a coating film having a thickness of 150 μm thereon; and (3) measuring a light transmittance of the obtained coating film in a wavelength region of 380 to 700 nm using a self-recording photoelectric spectrophotometer; and an ink base solution comprising a dispersant and water, said functional material being contained in an amount of 1 to 20% by weight based on the weight of the ink base solution.

In a sixth aspect of the present invention, there is provided a process for producing a functional material comprising fine coloring particles, comprising:

mixing inorganic compound particles with a gluing agent under stirring to form a gluing agent coat on surface of the inorganic compound particles;

adding organic pigments to the inorganic compound particles coated with the gluing agent, and mixing the resultant mixture under stirring to adhere the organic pigments on the gluing agent coat, thereby obtaining composite particles; and dissolving the inorganic compound particles only or both of the inorganic compound particles and the gluing agent from the composite particles.

DETAILED DESCRIPTION OF THE INVENTION

The present invention will now be described in detail below.

First, the functional material composed of fine coloring particles according to the present invention is described.

The functional material of the present invention composed of fine coloring particles, has an average particle diameter of usually 1 to 150 nm, preferably 1 to 100 nm, more preferably 1 to 50 nm. When the average particle diameter of the functional material is more than 150 nm, the tinting strength and transparency thereof tend to be deteriorated due to large particle size. The functional material according to the present invention is constituted by a flocculate of the fine coloring particles in a dried state, and the average particle diameter is of the flocculate thereof.

Also, the fine coloring particles in a dried state according to the present invention have an average primary particle diameter of usually 1 to 50 nm, preferably 1 to 40 nm, more preferably 1 to 30 nm. The fine coloring particles according to the present invention which are a flocculate in a dried state, easily become separated fine particles by a weak force and the average primary particle diameter is of the separated particles as primary particles.

The functional material composed of the fine coloring particles according to the present invention may have any suitable shape such as indeterminate shape, spherical shape, granular shape, polyhedral shape, acicular shape, spindle shape, rice-ball shape, flake shape, scale shape and plate shape, and may also have a hollow structure thereof.

The functional material composed of the fine coloring particles according to the present invention has a BET specific surface area value of usually 30 to 500 $m^2/g$, preferably 40 to 450 $m^2/g$, more preferably 45 to 400 $m^2/g$. When the BET specific area value is less than 30 $m^2/g$, the obtained functional material may become coarse, resulting in deteriorated tinting strength and poor transparency.

The functional material composed of the fine coloring particles according to the present invention has a tinting strength of usually not less than 110%, preferably not less than 115%, more preferably not less than 120%. When the tinting strength is less than 110%, such a tinting strength of the functional material is merely similar to that of the conventional organic pigments, so that the functional material fails to show a sufficiently high tinting strength.

The functional material composed of the fine coloring particles according to the present invention has a light transmittance of usually not less than 80%, preferably not less than 85%, more preferably not less than 90% when evaluated by the following method:

(1) blending 5 g of the functional material (fine coloring particles) (which correspond to 9.9 parts by weight based on 100 parts by weight of total amount of the functional material and a paint base material) and the following components as a paint base material at the below-mentioned mixing ratio in a 250 ml glass bottle, and mixing and dispersing the resultant mixture together with 160 g of 3 mmφ glass beads using a paint shaker for 120 minutes, thereby preparing a paint:

| | |
|---|---|
| Functional material | 9.9 parts by weight |
| Melamine resin | 19.8 parts by weight |
| Alkyd resin | 39.6 parts by weight |
| Xylene | 29.7 parts by weight |
| Butanol | 1.0 part by weight; |

(2) applying the thus prepared paint onto a 100 μm-thick clear film to form a coating film having a thickness of 150 μm thereon; and (3) measuring a light transmittance of the obtained coating film in a wavelength region of 380 to 700 nm using a self-recording photoelectric spectrophotometer, in which the light transmittance (%) is expressed by the highest peak value.

When the light transmittance is less than 80%, the transparency may become insufficient.

Next, the dispersion according to the present invention is described.

The dispersion according to the present invention is in the form of a water-based dispersion comprising the functional material composed of the fine coloring particles and water and/or a water-soluble organic solvent as a dispersion base material, or in the form of a solvent-based dispersion comprising the functional material composed of the fine coloring particles and an organic solvent as a dispersion base material. The dispersion of the present invention contains the functional material in an amount of usually 5 to 1000 parts by weight, preferably 10 to 800 parts by weight based on 100 parts by weight of the dispersion base material.

The dispersion base material includes a solvent component composed of either water and/or a water-soluble organic solvent, or an organic solvent, as well as optional components such as resins, defoaming agents, extender, drying promoters, surfactants, hardening accelerators, various assistants, etc.

Examples of the solvent used for the water-based dispersion may include water; water-soluble organic solvents ordinarily used for water-based paints, e.g., alcohol-based solvents such as ethyl alcohol, propyl alcohol and butyl alcohol, glycol ether-based solvents such as propylene glycol monomethyl ether, propylene glycol monoethyl ether, ethylene glycol monopropyl ether, methyl cellosolve, ethyl cellosolve, propyl cellosolve and butyl cellosolve, oxyethylene or oxypropylene addition polymers such as diethylene glycol, triethylene glycol, polyethylene glycol, dipropylene glycol, tripropylene glycol and polypropylene glycol, alkylene glycols such as ethylene glycol, propylene glycol and 1,2,6-hexane triol, glycerin, 2-pyrrolidone, or the like; or a mixed solvent of water and the above water-soluble organic solvent.

Examples of the solvent used for the solvent-based dispersion may include solvents ordinarily used for solvent-based paints, e.g., soybean oil, toluene, xylene, thinner, butyl acetate, methyl acetate, methyl isobutyl ketone, glycol ether-based solvents such as propylene glycol monomethyl ether, propylene glycol monoethyl ether, ethylene glycol monopropyl ether, methyl cellosolve, ethyl cellosolve, propyl cellosolve, butyl cellosolve and propylene glycol monomethyl ether, ester-based solvents such as ethyl acetate, butyl acetate and amyl acetate, aliphatic hydrocarbon-based solvents such as hexane, heptane and octane, alicyclic hydrocarbon-based solvents such as cyclohexane, petroleum-based solvents such as mineral spirits, ketone-based solvents such as acetone and methyl ethyl ketone, alcohol-based solvents such as methyl alcohol, ethyl alcohol, propyl alcohol and butyl alcohol, aliphatic hydrocarbons or the like.

Examples of the resins used for the water-based dispersion may include resins ordinarily used for water-based paints or aqueous inks such as water-soluble acrylic resins, water-soluble styrene-maleic acid copolymer resins, water-soluble alkyd resins, water-soluble melamine resins, water-soluble urethane emulsion resins, water-soluble epoxy resins, water-soluble polyester resins or the like.

Examples of the resins used for the solvent-based dispersion may include resins ordinarily used for solvent-based paints or oil-based printing inks such as acrylic resins, alkyd resins, polyester resins, polyurethane resins, epoxy resins, phenol resins, melamine resins, amino resins, vinyl chloride resins, silicone resins, rosin-based resins such as gum rosin and lime rosin, maleic acid resins, polyamide resins, nitrocellulose, ethylene-vinyl acetate copolymer resins, rosin-modified resins such as rosin-modified phenol resins and rosin-modified maleic acid resins, petroleum resins or the like.

The dispersion of the present invention has a light transmittance of usually not less than 60%, preferably not less than 65%, more preferably not less than 70%.

In the case of the water-based dispersion, the light transmittance thereof is measured as follows. Namely, the fine coloring particles as the functional material are added to water to prepare a water dispersion having a concentration of 0.04% by weight. The thus prepared water dispersion is placed in a quartz cell, and the light transmittance thereof is measured in a wavelength region of 380 to 700 nm using a self-recording photoelectric spectrophotometer, in which the light transmittance (%) is expressed by the highest measured value.

In the case of the solvent-based dispersion, the light transmittance thereof is measured as follows. Namely, the fine coloring particles as the functional material are added to toluene to prepare a toluene dispersion having a concentration of 0.04% by weight. The thus prepared toluene dispersion is placed in a quartz cell, and the light transmittance thereof is measured in a wavelength region of 380 to 700 nm using a self-recording photoelectric spectrophotometer, in which the light transmittance (%) is expressed by the highest measured value.

Next, the process for producing the fine coloring particles as the functional material according to the present invention is described.

Examples of the inorganic compound particles as core particles used in the present invention may include metals, alloys, oxides, hydroxides, carbonates, nitrides or the like which are soluble in acids or alkalis. Specific examples of the inorganic compound particles may include metals such as metal iron; oxides such as silica, magnetite, hematite, maghemite, zinc oxide and magnesium oxide; hydroxides such as goethite, magnesium hydroxide and hydrotalcite; carbonates such as calcium carbonate, strontium carbonate and barium carbonate; nitrides such as trisilicon tetranitride ($Si_3N_4$); or the like. Among these inorganic compound particles, preferred are oxides, hydroxides and carbonates, and more preferred are silica, magnetite, zinc oxide and calcium carbonate.

The particle shape of the inorganic compound particles as core particles used in the present invention is not restricted to particular one, and the inorganic compound particles may be granular particle such as spherical particles, granular particles, octahedral particles, hexahedral particles and polyhedral particles; acicular particle such as acicular particles, spindle-shaped particles and rice ball-shaped particles; plate-shaped particles such as plate-shaped particles, flake-shaped particles and scale-shaped particles; or the like.

The inorganic compound particles used in the present invention have an average particle diameter of usually 0.001 to 1.0 μm, preferably 0.005 to 0.75 μm, more preferably 0.01 to 0.75 μm.

The inorganic compound particles used in the present invention have a BET specific surface area value of usually 1 to 250 $m^2/g$, preferably 2 to 200 $m^2/g$.

The gluing agent used in the present invention is not particularly restricted as long as the organic pigments can be adhered onto the surface of the inorganic compound particles through the gluing agent. Examples of the preferred gluing agents may include organosilicon compounds such as alkoxysilanes, fluoroalkylsilanes and polysiloxanes; various coupling agents such as silane-based coupling agents, titanate-based coupling agents, aluminate-based coupling agents and zirconate-based coupling agents; oligomers or polymer compounds; or the like. These gluing agents may be used alone or in the form of a mixture of any two or more thereof. In the consideration of adhesion strength of the organic pigments onto the surface of the inorganic compound particles through the gluing agent, the more preferred gluing agents are the organosilicon compounds such as alkoxysilanes, fluoroalkylsilanes and polysiloxanes, and various coupling agents such as silane-based coupling agents, titanate-based coupling agents, aluminate-based coupling agents and zirconate-based coupling agents.

In particular, in the case where fine silica particles are used as the inorganic compound particles, it is preferable to use the organosilicon compounds or the silane-based coupling agents as the gluing agent.

As organosilicon compounds used in the present invention, at least one organosilicon compound selected from the group consisting of (1) organosilane compounds obtained from alkoxysilane compounds; (2) polysiloxanes, (3) modified polysiloxanes, (4) terminal-modified polysiloxanes and (5) fluoroalkyl organosilane compounds obtained from fluoroalkylsilane compounds.

The organosilane compounds can be produced from alkoxysilane compounds represented by the formula (I):

wherein $R^1$ is $C_6H_5$—, $(CH_3)_2CHCH_2$— or n-$C_bH_{2b+1}$— (wherein b is an integer of 1 to 18); X is $CH_3O$— or $C_2H_5O$—; and a is an integer of 0 to 3.

Specific examples of the alkoxysilane compounds may include methyltriethoxysilane, dimethyldiethoxysilane, phenyltriethyoxysilane, diphenyldiethoxysilane, dimethyldimethoxysilane, methyltrimethoxysilane, phenyltrimethoxysilane, diphenyldimethoxysilane, isobutyltrimethoxysilane, decyltrimethoxysilane or the like.

Among these alkoxysilane compounds, in view of the adhering effect of the organic pigments to the surface of the inorganic compound particles, methyltriethoxysilane, methyltrimethoxysilane, dimethyldimethoxysilane, isobutyltrimethoxysilane and phenyltriethyoxysilane are preferred, and methyltriethoxysilane, methyltrimethoxysilane, dimethyldimethoxysilane and phenyltriethyoxysilane are more preferred.

As the polysiloxanes, there may be used those compounds represented by the formula (II):

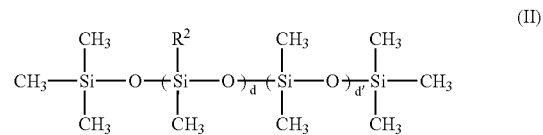

wherein $R^2$ is H— or $CH_3$—, d is an integer of 15 to 370, and d' is an integer of 15 to 370.

As the modified polysiloxanes, (a) there may be used polysiloxanes modified with polyethers represented by the formula (III):

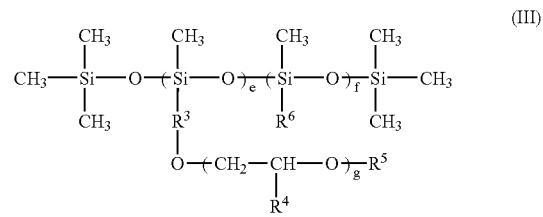

wherein $R^3$ is —$(CH_2)_h$—; $R^4$ is —$(CH_2)_i$—$CH_3$; $R^5$ is —OH, —COOH, —CH=$CH_2$, —C($CH_3$)=$CH_2$ or —$(-CH_2-)_j-CH_3$; $R^6$ is —$(-CH_2-)_k-CH_3$; g and h are an integer of 1 to 15; i, j and k are an integer of 0 to 15; e is an integer of 1 to 50; and f is an integer of 1 to 300;

(b) polysiloxanes modified with polyesters represented by the formula (IV):

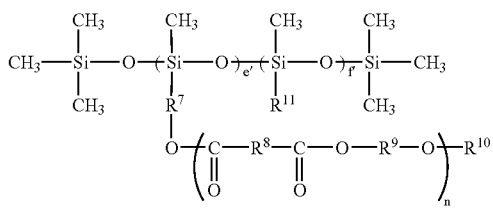

(IV)

wherein $R^7$, $R^8$ and $R^9$ are —$(-CH_2-)_q$— and may be the same or different; $R^{10}$ is —OH, —COOH, —CH=CH$_2$, —CH(CH$_3$)=CH$_2$ or —$(-CH_2-)_r-CH_3$; $R^{11}$ is —$(-CH_2-)_s-CH_3$; n and q are an integer of 1 to 15; r and s are an integer of 0 to 15; e' is an integer of 1 to 50; and f' is an integer of 1 to 300; and (c) polysiloxanes modified with epoxy compounds represented by the formula (V):

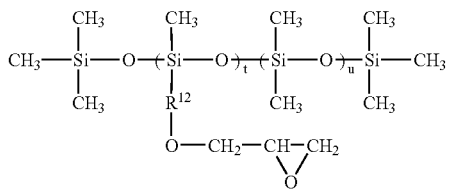

(V)

wherein $R^{12}$ is —$(-CH_2-)_v$—; v is an integer of 1 to 15; t is an integer of 1 to 50; and u is an integer of 1 to 300; or a mixture thereof.

As the terminal-modified polysiloxanes, there may be used those represented by the formula (IV):

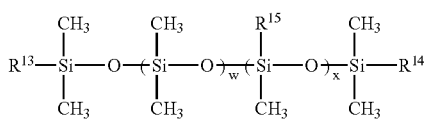

(VI)

wherein $R^{13}$ and $R^{14}$ are —OH, $R^{16}$OH or $R^{17}$COOH and may be the same or different; $R^{15}$ is —CH$_3$ or —C$_6$H$_5$; $R^{16}$ and $R^{17}$ are —$(-CH_2-)_y$—; y is an integer of 1 to 15; w is an integer of 1 to 200; and x is an integer of 0 to 100.

Among these polysiloxanes, in view of the adhering effect of the organic pigment, polysiloxanes having methyl hydrogen siloxane units, the polysiloxanes modified with the polyethers represented by the formula (III), and the polysiloxanes whose terminals are modified with carboxylic acid groups, are preferred.

The fluoroalkyl organosilane compounds may be produced from fluoroalkylsilane compounds represented by the formula (VII):

$CF_3(CF_2)_zCH_2CH_2(R^{18})_{a'}SiX_{3-a'}$ (VII)

wherein $R^{18}$ is CH$_3$—, C$_2$H$_5$—, CH$_3$O— or C$_2$H$_5$O—; X is CH$_3$O— or C$_2$H$_5$O—; and z is an integer of 0 to 15; and a' is an integer of 0 to 2.

Specific examples of the fluoroalkylsilane compounds may include trifluoropropyl trimethoxysilane, tridecafluorooctyl trimethoxysilane, heptadecafluorodecyl trimethoxysilane, heptadecafluorodecylmethyl dimethoxysilane, trifluoropropyl triethoxysilane, tridecafluorooctyl triethoxysilane, heptadecafluorodecyl triethoxysilane, or the like.

Among these fluoroalkylsilane compounds, in view of the adhering effect of the organic pigment, trifluoropropyl trimethoxysilane, tridecafluorooctyl trimethoxysilane and heptadecafluorodecyl trimethoxysilane are preferred, and trifluoropropyl trimethoxysilane and tridecafluorooctyl trimethoxysilane are more preferred.

As the silane-based coupling agents, there may be exemplified vinyltrimethoxysilane, vinyltriethoxysilane, γ-aminopropyltriethoxysilane, γ-glycidoxypropyltrimethoxysilane, γ-mercaptopropyltrimethoxysilane, γ-methacryloxypropyltrimethoxysilane, N-β(aminoethyl)-γ-aminopropyltrimethoxysilane, γ-glycidoxypropylmethyldimethoxysilane, γ-chloropropyltrimethoxysilane or the like.

As the titanate-based coupling agents, there may be exemplified isopropyltristearoyl titanate, isopropyltris(dioctylpyrophosphate)titanate, isopropyltri(N-aminoethyl-aminoethyl)titanate, tetraoctylbis(ditridecylphosphate)titanate, tetra (2,2-diaryloxymethyl-1-butyl)bis(ditridecyl)phosphate titanate, bis(dioctylpyrophosphate)oxyacetate titanate, bis(dioctylpyrophosphate)ethylene titanate or the like.

As the aluminate-based coupling agents, there may be exemplified acetoalkoxyaluminum diisopropilate, aluminumdiisopropoxymonoethylacetoacetate, aluminumtrisethylacetoacetate, aluminumtrisacetylacetonate or the like.

As the zirconate-based coupling agents, there may be exemplified zirconiumtetrakisacetylacetonate, zirconiumdibutoxybisacetylacetonate, zirconiumtetrakisethylacetoacetate, zirconiumtributoxymonoethylacetoacetate, zirconiumtributoxyacetylacetonate or the like.

It is preferred to use oligomer compounds having a molecular weight of from 300 to less than 10,000. It is more preferred to use polymer compounds having a molecular weight of 10,000 to about 100,000. In the consideration of forming a uniform coating layer on the inorganic compound particles, the oligomers or polymer compounds are preferably in a liquid state, or soluble in water or various solvents.

Examples of the organic pigments used in the present invention may include various organic pigments ordinarily used as colorants of paints and resin compositions, such as organic red-based pigments, organic blue-based pigments, organic yellow-based pigments, organic green-based pigments, organic orange-based pigments, organic brown-based pigments, organic violet-based pigments and organic black-based pigments.

Among various organic pigments mentioned above, specific examples of the organic red-based pigments may include quinacridon pigments such as quinacridon red, azo-based pigments such as permanent red, condensed azo pigments such as condensed azo red, condensed polycyclic pigment such as diketo-pyrrolo-pyrrole, perylene red or the like; specific examples of the organic blue-based pigments may include phthalocyanine-based pigments such as metal-free phthalocyanine blue, phthalocyanine blue and fast sky blue, alkali blue; specific examples of the organic yellow-based pigments may include monoazo-based pigments such as Hanza yellow, disazo-based pigments such as benzidine yellow and permanent yellow, condensed azo pigments such as condensed azo yellow, condensed polycyclic pigment such as isoindolinone yellow, isoindoline yellow, or the like; specific examples of the organic green-based pigments may include phthalocyanine-based pigments such as phthalocyanine green, or the like; and specific examples of the organic black-based pigments may include aniline black, perylene black or the like.

The gluing agent coat may be formed on the surface of the inorganic compound particles by mechanically mixing and stirring the inorganic compound particles with the gluing agent or a solution of the gluing agent, or by mechanically mixing and stirring the inorganic compound particles while spraying the gluing agent or a solution of the gluing agent thereonto. Substantially whole amount of the gluing agent added is adhered on the surface of the inorganic compound particles for forming the gluing agent coat thereon.

Meanwhile, in the case where alkoxysilanes or fluoroalkylsilanes are used as the gluing agent, a part of the alkoxysilanes or fluoroalkylsilanes adhered may be coated in the form of organosilane compounds obtainable from the alkoxysilanes or fluorine-containing organosilane compounds obtainable from the fluoroalkylsilanes, through the coating step. In any of these cases, subsequent adhesion of the organic pigments on the gluing agent coat is not adversely affected.

In order to uniformly adhere the gluing agent over the surface of the inorganic compound particles, it is preferred that the agglomerated inorganic compound particles are previously deaggregated using a pulverizer.

As the apparatuses for mixing and stirring the inorganic compound particles with the gluing agent, or mixing and stirring the organic pigments with the gluing agent-coated inorganic compound particles, there may be used those apparatuses capable of applying a shear force to a layer composed of these particles, in particular, such apparatuses capable of effecting shear action, spatula stroking and compression at the same time. Examples of such apparatuses may include wheel-type kneaders, ball-type kneaders, blade-type kneaders, roll-type kneaders or the like. Among these apparatuses, the wheel-type kneaders can be more effectively used in the present invention.

Specific examples of the wheel-type kneaders may include edge runners (similar in meaning to mix muller, Simpson mill and sand mill), multimill, Stotz mill, Wet pan mill, corner mill, ring muller or the like. Among these kneaders, preferred are edge runners, multimill, Stotz mill, Wet pan mill and ring muller, and more preferred are edge runners.

Specific examples of the ball-type kneaders may include vibration mill or the like. Specific examples of the blade-type kneaders may include Henschel mixer, planetary mixer, Nauter mixer or the like. Specific examples of the roll-type kneaders may include extruders or the like.

The conditions of the mixing and stirring treatment may be selected so as to uniformly coat the surface of the inorganic compound particles with the gluing agent. Specifically, the mixing and stirring conditions may be appropriately controlled such that the linear load is usually 19.6 to 1,960 N/cm (2 to 200 Kg/cm), preferably 98 to 1,470 N/cm (10 to 150 Kg/cm), more preferably 147 to 980 N/cm (15 to 100 Kg/cm); the treating time is usually 5 minutes to 24 hours, preferably 10 minutes to 20 hours; and the stirring speed is usually 2 to 2,000 rpm, preferably 5 to 1,000 rpm, more preferably 10 to 800 rpm.

The amount of the gluing agent added is preferably 0.15 to 45 parts by weight based on 100 parts by weight of the inorganic compound particles. When the gluing agent is added in an amount of 0.15 to 45 parts by weight, it is possible to adhere 1 to 500 parts by weight of the organic pigment based on 100 parts by weight of the inorganic compound particles.

After the surface of the inorganic compound particles is coated with the gluing agent, the organic pigment is added, and then mixed and stirred with the coated inorganic compound particles to adhere the organic pigment onto the gluing agent-coating layer. The obtained particles may be further subjected to drying or heating treatments, if required.

The amount of the organic pigments added is usually 1 to 500 parts by 510 to 300 parts by weight based on 100 parts by weight of the inorganic compound particles.

It is preferred that the organic pigments are gradually added little by little for a period of preferably about 5 minutes to about 24 hours, more preferably about 5 minutes to about 20 hours, or the organic pigments of 5 to 25 parts by weight based on 100 parts by weight of the inorganic compound particles are intermittently added until reaching the desired total amount thereof.

The mixing and stirring conditions may be appropriately selected so as to form a uniform organic pigment coat on the gluing agent-coating layer, and may be controlled such that the linear load is usually 19.6 to 1,960 N/cm (2 to 200 Kg/cm), preferably 98 to 1,470 N/cm (10 to 150 Kg/cm), more preferably 147 to 980 N/cm (15 to 100 Kg/cm); the treating time is usually 5 minutes to 24 hours, preferably 10 minutes to 20 hours; and the stirring speed is usually 2 to 2,000 rpm, preferably 5 to 1,000 rpm, more preferably 10 to 800 rpm.

The heating temperature used upon the drying and heating treatments is usually 40 to 150° C., preferably 60 to 120° C. The heating time is usually from 10 minutes to 12 hours, preferably from 30 minutes to 3 hours.

Meanwhile, when alkoxysilanes or fluoroalkylsilanes are used as the gluing agent, a coating layer comprising organosilane compounds obtainable from the alkoxysilanes or fluorine-containing organosilane compounds obtainable from the fluoroalkylsilanes, is finally formed on the respective inorganic compound particles via these treatment steps.

The obtained composite particles have an average particle diameter of usually 0.001 to 0.50 μm, preferably 0.005 to 0.40 μm, more preferably 0.01 to 0.30 μm; and a BET specific surface area value of usually 1.0 to 500 $m^2/g$, preferably 1.5 to 400 $m^2/g$, more preferably 2.0 to 300 $m^2/g$.

The degree of desorption of the organic pigments from the surface of the composite particles is preferably the rank 5 or 4, more preferably the rank 5 when visually observed and evaluated by the below-mentioned method. When the degree of desorption of the organic pigments is the rank 1, 2 or 3, the desorbed organic pigments tend to be re-crystallized or agglomerated to form coarse particles, thereby causing such a disadvantage that the re-crystallized or agglomerated particles in the form of coarse particles are mixed in the fine coloring particles as a final product.

The composite particles are then treated with acids or alkalis to dissolve out the inorganic compound particles as core particles only or both of the inorganic compound particles and the gluing agent therefrom.

The acids or alkalis used for the dissolution treatment may be appropriately selected according to kinds of inorganic compound particles used. Examples of the acids may include hydrochloric acid, sulfuric acid, oxalic acid, acetic acid, aqueous carbonic acid solution, hydrofluoric acid or the like. Examples of the alkalis may include an aqueous sodium hydroxide solution, ammonia or the like.

Upon the dissolution treatment, the concentration of the composite particles contained in the dissolving solution is usually 1.0 to 25.0 parts by weight, preferably 2.5 to 20.0 parts by weight, more preferably 5.0 to 15.0 parts by weight based on 100 ml of the dissolving solution.

The acid or alkali concentration (mol/liter) of the dissolving solution used upon the dissolution treatment may be not less than the stoichiometric amount capable of dissolving the inorganic compound particles. When the acid or alkali concentration is less than the stoichiometric amount, the inorganic compound particles cannot be completely dissolved, thereby failing to obtain the fine coloring particles aimed by the present invention. In the consideration of treating time and treating temperature, the acid or alkali concentration of the dissolving solution is preferably not less than 1.1 times the stoichiometric amount, more preferably not less than 1.2 times the stoichiometric amount.

The reaction temperature upon the dissolution treatment is usually 20 to 100° C., preferably 20 to 80° C. When the reaction temperature is less than 20° C., it takes a long time to dissolve the inorganic compound particles, resulting in industrially disadvantageous process. When the reaction temperature is more than 100° C., special apparatuses such as autoclave are required for the dissolution treatment, also resulting in industrially disadvantageous process.

The terminal point of the dissolution treatment is determined as follows. That is, the reaction solution during the dissolution treatment is successively sampled and each sampled solution is separated by filtration into solid and the dissolving solution. The obtained solid is added to a fresh dissolving solution for dissolution treatment thereof. Then, the obtained solution is separated by filtration into solid and the dissolving solution. The obtained solution as filtrate is analyzed by an inductively coupled high-frequency plasma atomic emission spectroscope. The sampling point at which metal elements constituting the core particles of the composite particles are no longer detected from the filtrate, is determined to be the terminal point.

By subjecting the composite particles to such a dissolution treatment, it is possible to obtain hollow particles composed of organic pigments which can still retain a similar shape to that of the inorganic compound particles, and/or much finer particles composed of the organic pigments, which no longer retain the similar shape due to breaking of the hollow particles.

After the dissolution treatment, the obtained solution is separated by filtration into solid and the dissolving solution, and the thus obtained solid is freeze-dried, thereby obtaining fine coloring particles as the functional material.

Next, the process for producing the dispersion according to the present invention is described.

The water-based dispersion of the present invention is produced by re-dispersing the fine coloring particles as the functional material which are obtained by the freeze-drying process, in water or a mixture of water and a water-soluble organic solvent, or by separating the solution obtained after the dissolution treatment into solid and the dissolving solution by means of filtration, washing the obtained solid with water, and then dispersing the solid in water or a mixture of water and a water-soluble organic solvent. If required, various additives such as resins, defoaming agents, surfactants, etc., may be added to the water-based dispersion.

The solvent-based dispersion of the present invention is produced by re-dispersing the fine coloring particles as the functional material which are obtained by the freeze-drying process, in an organic solvent or an oily vehicle, or by separating the solution obtained after the dissolution treatment into solid and the dissolving solution by means of filtration, washing the obtained solid with water, flashing the obtained paste-like solid with the organic solvent or the oily vehicle, and then dispersing the paste-like solid in the organic solvent or the oily vehicle. If required, various additives such as resins, surfactants, etc., may be added to the solvent-based dispersion.

The functional material composed of the fine coloring particles according to the present invention can be used as colorants for resin compositions, ink-jet printing inks, paints, printing inks, etc.

The resin composition according to the present invention comprises the functional material composed of the fine coloring particles and known thermoplastic resins as well as, if required, additives such as lubricants, plasticizers, antioxidants, ultraviolet light absorbers, various stabilizers or the like.

The amount of the functional material composed of the fine coloring particles blended in the resin composition of the present invention is in the range of usually 0.01 to 200 parts by weight based on 100 parts by weight of resins contained in the resin composition. In the consideration of handling property of the resin composition, the amount of the functional material composed of the fine coloring particles blended therein is preferably 0.05 to 150 parts by weight, more preferably 0.1 to 100 parts by weight based on 100 parts by weight of the resins.

Examples of the reins may include thermoplastic resins, e.g., polyolefins such as polyethylene, polypropylene, polybutene and polyisobutylene, polyvinyl chloride, polymethyl pentene, polyethylene terephthalate, polybutylene terephthalate, polystyrene, styrene-acrylic acid ester copolymers, styrene-vinyl acetate copolymers, acrylonitrile-butadiene-styrene copolymers, acrylonitrile-EPDM-styrene copolymers, acrylic resins, polyamides, polycarbonates, polyacetal and polyurethane; rosin-modified maleic acid resins; phenol resins; epoxy resins; polyester resins; silicone resins; rosin esters; rosins; natural rubbers, synthetic rubbers; or the like.

The resin composition tinted with the functional material composed of the fine coloring particles according to the present invention exhibits a dispersing condition of usually the rank 4 or 5, preferably the rank 5 when visually observed and evaluated by the below-mentioned method; and a light transmittance of usually not less than 80%, preferably not less than 85%.

Next, the ink-jet printing ink containing the functional material composed of the fine coloring particles according to the present invention is described.

The ink-jet printing ink according to the present invention comprises the functional material composed of the fine coloring particles according to the present invention and as an ink base solution, a dispersant, water, and, if required, a penetrant, a humectant, a water-soluble solvent, a pH modifier, a preservative or the like.

The amount of the functional material composed of the fine coloring particles contained in the ink-jet printing ink is usually 1 to 20% by weight based on the weight of the ink base solution. The amount of the dispersant contained in the ink-jet printing ink is preferably 5 to 200% by weight, more preferably 7.5 to 150% by weight based on the weight of the functional material as pigments contained in the ink-jet printing ink.

As the dispersant, there may be used high-molecular dispersants and/or surfactants such as surfactant may include anionic surfactants, nonionic surfactants and cationic surfactants. In the consideration of the effect of improving the dispersibility of the functional material in the ink-jet printing ink and good dispersion stability of the obtained ink, anionic surfactants and nonionic surfactants are preferably used as the surfactant, and water-soluble resins such as styrene-acrylic acid copolymers are preferably used as the high-molecular dispersant.

Specific examples of the preferred anionic surfactants may include fatty acid salts, sulfuric acid esters, sulfonic acid salts, phosphoric acid esters or the like. Among these anionic surfactants, sulfuric acid esters and sulfonic acid salts are more preferred.

Specific examples of the preferred nonionic surfactants may include polyethylene glycol-type nonionic surfactants such as polyoxyethylene alkyl ethers and polyoxyethylene aryl ethers; polyhydric alcohol-type nonionic surfactants such as sorbitan fatty acid esters; or the like. Among these nonionic surfactants, polyethylene glycol-type nonionic surfactants are more preferred.

Specific examples of the preferred cationic surfactants may include amine salt-type cationic surfactants, quaternary ammonium salt-type cationic surfactants or the like. Among these cationic surfactants, the quaternary ammonium salt-type cationic surfactants are more preferred.

As the polymeric dispersing agent, there may be used alkali-soluble resins such as styrene-acrylic acid copolymers, styrene-maleic acid copolymers, polyacrylic acid derivatives or the like.

As the solvent for the ink-jet printing ink, water may be used, if required, in combination with a water-soluble organic solvent. The amount of the water-soluble organic solvent contained in the ink-jet printing ink is usually 1 to 50% by weight, preferably 1 to 40% by weight, more preferably 1 to 30% by weight based on the weight of the ink base solution.

Examples of the water-soluble organic solvent for the ink-jet printing ink may include monohydric alcohols such as methanol, ethanol, n-propanol and isopropanol; dihydric alcohols such as ethylene glycol, diethylene glycol, triethylene glycol, tetraethylene glycol, propylene glycol and dipropylene glycol; trihydric alcohols such as glycerol; polyalkylene glycols such as polyethylene glycol; lower alkyl ethers of polyhydric alcohols such as propylene glycol monomethyl ether, propylene glycol monoethyl ether, ethylene glycol monopropyl ether, diethylene glycol monobutyl ether, ethylene glycol monobutyl ether and ethylene glycol monoethyl ether; or the like. Among these water-soluble organic solvents, dihydric alcohols are preferred. These water-soluble organic solvents may be used alone or in the form of a mixture of any two or more thereof.

The functional material composed of the fine coloring particles contained in the ink-jet printing ink of the present invention has a dispersed particle diameter of preferably not more than 0.2 μm, more preferably not more than 0.1 μm. The dispersion stability of the ink-jet printing ink of the present invention is preferably the rank 4 or 5, more preferably the rank 5 when visually observed and evaluated by the below-mentioned method. The percentage of change in dispersed particle diameter is preferably not more than 10%, more preferably not more than 8%.

The point of the present invention is that the functional material composed of the fine coloring particles according to the present invention can exhibit not only an excellent transparency, but also a high tinting strength and a clear hue.

The reason why the functional material composed of the fine coloring particles according to the present invention can exhibit an excellent transparency, is considered as follows. That is, since the organic pigments which generally tend to be agglomerated and, therefore, act as secondary particles, are formed into fine coloring particles having an average primary particle diameter as small as not more than 50 nm in a dried state, the light-scattering coefficient thereof can be considerably reduced.

The reason why the functional material composed of the fine coloring particles according to the present invention can exhibit a clear hue, is considered as follows, though not clearly determined yet. That is, organic pigments usually tend to undergo undesirable crystal growth at respective stages of synthesis thereof due to their specific crystal structure, so that it may be difficult to attain a uniform crystal size. As a result, absorption peak at the wavelength inherent to each color becomes broad. Whereas, in the case of the functional material composed of the fine coloring particles according to the present invention, since the particle size thereof can be reduced to near molecular level similar to dyes, it is considered that the absorption peak at the wavelength inherent to each color becomes much sharper.

The functional material composed of the fine coloring particles according to the present invention, is in the form of fine coloring particles, and can exhibit not only an excellent transparency, but also a high tinting strength and a clear hue. Therefore, the functional material can be suitably used as a colorant.

Thus, the functional material composed of the fine coloring particles according to the present invention can exhibit the above excellent properties and, therefore, can be suitably used as colorants for resin compositions, ink-jet printing inks, paints and printing inks.

EXAMPLES

The present invention is described in more detail by Examples and Comparative Examples, but the Examples are only illustrative and, therefore, not intended to limit the scope of the present invention thereto.

Various properties were measured by the following methods.

(1) The average primary Particle diameter of the particles was expressed by the average value of measured particle diameters of 350 particles observed on an electron micrograph (×50,000).

(2) The average particle diameter of the secondary particles (flocculate) of the functional material was expressed by the average value of particle diameters obtained by following method. The particle diameter of the secondary particles (flocculate) contained in the dispersion obtained by mixing the secondary particles (flocculate) with water and dispersing the secondary particles (flocculate) in water for one minute using an ultrasonic dispersing apparatus, was measured by a dynamic light scattering method using a concentration-type particle size analyzer "FPAR-1000" manufactured by Ohtsuka Denshi Co., Ltd.

(3) The specific surface area was expressed by the value measured by a BET method.

(4) The amounts of the gluing agent-coating layer formed on the surface of the inorganic compound particles, and the organic pigment coat formed on the gluing agent-coating layer were respectively determined by measuring the carbon contents using "Horiba Metal, Carbon and Sulfur Analyzer EMIA-2200 Model" (manufactured by HORIBA SEISAKUSHO CO., LTD.).

(5) The hue of each of the organic pigment and functional material, were measured by the following method.

That is, 0.5 g of each sample and 0.5 ml of castor oil were intimately kneaded together by a Hoover's muller to form a paste. 4.5 g of clear lacquer was added to the obtained paste and was intimately kneaded to form a paint. The obtained paint was applied on a clear film by using a 150 μm (6-mil) applicator to produce a coating film piece (having a film thickness of about 30 μm). The thus obtained coating film piece was measured by a multi-spectro-colour-meter "MSC-IS-2D" (manufactured by SUGA TESTING MACHINES MANUFACTURING CO., LTD.) to determine L*, a* and b* values thereof, respectively. Meanwhile, the C* value representing chroma is calculated according to the following formula:

$$C^* = ((a^*)^2 + (b^*)^2)^{1/2}$$

(6) The tinting strength of the functional material was measured by the following method.

That is, a primary color enamel and a vehicle enamel prepared by the below-mentioned method were respectively applied on a cast-coated paper by a 150 μm (6-mil) applicator to produce coating film pieces. The thus obtained coating film pieces were measured by a multi-spectro-colour-meter "MSC-IS-2D" (manufactured by SUGA TESTING MACHINES MANUFACTURING CO., LTD.) to determine L* values thereof. The difference between the obtained L* values was represented by a ΔL* value.

Next, as a standard sample, using the organic pigment used for the production of the functional material, the same procedure as defined below was conducted to prepare an primary color enamel and a vehicle enamel, form coating film pieces and measure L* values thereof. The difference between the L* values was represented by a ΔLs* value.

From the obtained ΔL* value of the colorant and ΔLs* value of the standard sample, the tinting strength (%) was calculated according to the following formula:

Tinting strength(%)=100+{(Δ$Ls^*$–Δ$L^*$)×10}

Preparation of Primary Color Enamel:

10 g of the above sample particles, 16 g of an amino alkyd resin and 6 g of a thinner were blended together. The resultant mixture was added together with 90 g of 3 mmφ glass beads into a 140-ml glass bottle, and then mixed and dispersed for 45 minutes by a paint shaker. The obtained mixture was mixed with 50 g of an amino alkyd resin, and further dispersed for 5 minutes by a paint shaker, thereby obtaining an primary color enamel.

Preparation of Vehicle Enamel:

12 g of the above-prepared primary color enamel and 40 g of Amirac White (titanium dioxide-dispersed amino alkyd resin) were blended together, and the resultant mixture was mixed and dispersed for 15 minutes by a paint shaker, thereby preparing a vehicle enamel.

(7) The light transmittance of the functional material composed of fine coloring particles was measured by the following method:

(i) blending 5 g of the functional material (fine coloring particles) and the following components as a paint base material at the below-mentioned mixing ratio in a 250 ml glass bottle, and mixing and dispersing the resultant mixture together with 160 g of 3 mmφ glass beads using a paint shaker for 120 minutes, thereby preparing a paint:

| | |
|---|---|
| Functional material | 9.9 parts by weight |
| Melamine resin | 19.8 parts by weight |
| Alkyd resin | 39.6 parts by weight |
| Xylene | 29.7 parts by weight |
| Butanol | 1.0 part by weight; |

(ii) applying the thus prepared paint onto a 100 μm-thick clear film to form a coating film having a thickness of 150 μm thereon; and (iii) measuring a light transmittance of the obtained coating film in a wavelength region of 380 to 700 nm using a self-recording photoelectric spectrophotometer in which the light transmittance (%) is expressed by the highest peak value. The closer to 100% the light transmittance, the higher the transparency.

Meanwhile, when measuring the light transmittance values thereof, the clear film was used as blank.

(8) The degree of desorption of the organic pigments from the composite particles was evaluated by the following method, and the evaluation results were classified into the following five ranks. The rank 5 represents that the amount of the organic pigments desorbed from the surface of the composite particles was smallest.

That is, 2 g of the particles to be measured and 20 ml of ethanol were placed in a 50-ml conical flask, and then subjected to ultrasonic dispersion for 60 minutes. Thereafter, the obtained dispersion was centrifuged at a rotating speed of 10,000 rpm for 15 minutes to separate the dispersion into the particles and the ethanol solvent. The obtained particles were dried at 80° C. for one hour, and the micrograph (×50,000) thereof was visually observed to count the number of the desorbed and re-agglomerated organic pigment particles which were present in a visual field of the micrograph. The micrograph was compared with a micrograph (×50,000) of mixed particles obtained by simply mixing the inorganic compound particles with the organic pigments without forming the intermediate gluing agent coat. The evaluation results were classified into the following five ranks.

Rank 1: Number of desorbed particles was substantially the same as that in the simply mixed particles;

Rank 2: 30 to 49 desorbed particles per 100 composite particles were recognized;

Rank 3: 10 to 29 desorbed particles per 100 composite particles were recognized;

Rank 4: 5 to 9 desorbed particles per 100 composite particles were recognized; and Rank 5: 0 to 4 desorbed particles per 100 composite particles were recognized.

(9) The light transmittance of the dispersion containing the functional material composed of the fine coloring particles was measured by the following method. Namely, an aqueous solution containing 0.04% by weight of the functional material composed of the fine coloring particles in the case of the water-based dispersion, and a toluene solution containing 0.04% by weight of the functional material composed of the fine coloring particles in the case of the solvent-based dispersion, were respectively placed in a quartz cell, and the light transmittance thereof was measured in a wavelength region of 380 to 700 nm using a self-recording photoelectric spectrophotometer. The light transmittance (%) was expressed by the highest measured value.

Meanwhile, when measuring the light transmittance values of the dispersions, ion-exchanged water and toluene were used as blanks for the water-based dispersion and the solvent-based dispersion, respectively.

(10) The hue of the resin composition tinted with the functional material composed of the fine coloring particles was measured by the following method. That is, a colored resin plate prepared by the below-mentioned method was measured by a multi-spectro-colour-meter "MSC-IS-2D" (manufactured by SUGA SHIKENKI CO., LTD.) to determine L*, a* and b* values thereof.

(11) The light transmittance of the resin composition containing the functional material composed of the fine coloring particles was measured by the following method. Namely, the light transmittance of a colored resin plate prepared by the below-mentioned method was measured in a wavelength region of 380 to 700 nm using a self-recording photoelectric spectrophotometer. The light transmittance (%) was expressed by the highest measured value.

Meanwhile, when measuring the light transmittance value of the resin composition, a resin composition containing no fine coloring particles was used as a blank.

(12) The dispersibility of the resin composition tinted with the functional material composed of the fine coloring particles was evaluated by visually counting the number of undispersed aggregate particles on the surface of the obtained colored resin plate, and classifying the evaluation results into the following five ranks. The rank 5 represents the most excellent dispersing condition.

Rank 5: No undispersed aggregate particles were recognized.
Rank 4: 1 to 4 undispersed aggregate particles per 1 $cm^2$ were recognized;
Rank 3: 5 to 9 undispersed aggregate particles per 1 $cm^2$ were recognized;
Rank 2: 10 to 49 undispersed aggregate particles per 1 $cm^2$ were recognized;
Rank 1: Not less than 50 undispersed aggregate particles per 1 $cm^2$ were recognized.

(13) The dispersed particle diameter of particles contained in the dispersion and the ink-jet printing ink was measured by a concentration-type particle size analyzer "FPAR-1000" manufactured by Ohtsuka Denshi Co., Ltd.

(14) The dispersion stability of the dispersion and the ink-jet printing ink was evaluated as follows. That is, 25 ml of the dispersion or the ink-jet printing ink to be measured was placed in a color comparison tube, and allowed to stand at 60° C. for one week. Then, the degree of precipitation of the particles contained in the dispersion or the ink-jet printing ink was visually observed and evaluated. The observation results were classified into the following five ranks.

Rank 1: Length of uncolored portion was not less than 10 cm;
Rank 2: Length of uncolored portion was from 5 cm to less than 10 cm;
Rank 3: Length of uncolored portion was from 1 cm to less than 5 cm;
Rank 4: Length of uncolored portion was less than 1 cm;
Rank 5: Uncolored portion was not recognized.

(15) The percentage of change in dispersed particle diameter of particles contained in the dispersion and the ink-jet printing ink was determined as follows. That is, after the dispersion or the ink to be measured was allowed to stand at 60° C. for one week, the dispersed particle diameter of particles contained therein was measured by the above concentration-type particle size analyzer "FPAR-1000" manufactured by Ohtsuka Denshi Co., Ltd. The percentage of change in dispersed particle diameter was expressed by the value (%) obtained by dividing the amount of change in dispersed particle diameter between before and after the standing test by the dispersed particle diameter measured before the standing test.

Example 1

<Production of Functional Material>

140 g of methyl hydrogen polysiloxane (tradename: "TSF484", produced by GE TOSHIBA SILICONE CO., LTD.) was added to 7.0 kg of silica particles (particle shape: spherical shape; average particle diameter: 0.021 μm; BET specific surface area value: 196.2 $m^2$/g) while operating an edge runner, and the resultant mixture was mixed and stirred for 30 minutes under a linear load of 588 N/cm (60 kg/cm) at a stirring speed of 22 rpm.

Then, 7.0 kg of organic pigments B (kind: phthalocyanine-based pigments; particle shape: granular shape; average particle diameter: 0.06 μm; BET specific surface area value: 71.6 $m^2$/g; light transmittance: 71.0%; L* value: 17.70; a* value: 9.72; b* value: −23.44; C* value: 25.38) were added to the above-obtained mixture for 100 minutes while operating the edge runner, and the resultant mixture was mixed and stirred for 120 minutes under a linear load of 588 N/cm (60 kg/cm) at a stirring speed of 22 rpm, thereby adhering the organic pigments B onto the methyl hydrogen polysiloxane coating layer formed on the surface of the silica particles. The obtained particles were dried at 80° C. for 60 minutes using a dryer, thereby obtaining composite particles.

It was confirmed that the thus obtained composite particles were in the form of granular particles having an average particle diameter of 0.025 μm, and had a BET specific surface area value of 86.2 $m^2$/g, an organic pigment desorption degree of Rank 5, and a coating amount of methyl hydrogen polysiloxane of 0.52% by weight (calculated as C), and that the amount of the organic pigments B adhered was 33.21% by weight (calculated as C; corresponding to 100 parts by weight based on 100 parts by weight of the silica particles).

As a result of observing the micrograph of the obtained composite particle since almost no organic pigments B were recognized from the micrograph, it was confirmed that a substantially whole amount of the organic pigments B used contributed to the formation of the organic pigment coat on the coating layer composed of methyl hydrogen polysiloxane. Further, it was confirmed that the organic pigments B adhered no longer maintained the particle shape and size of those initially added, more specifically, the organic pigments B had a much finer particle size than that of the inorganic compound particles and were adhered in the form of a uniform adhesion coat on the surface of the inorganic compound particles.

A 1-liter plastic beaker was charged with 50.0 g of the above obtained composite particles and 500 ml of a 5.5 mol/l hydrofluoric acid aqueous solution (1.7 times the stoichiometric amount capable of dissolving the silica particles as core particles), and the contents of the beaker were stirred at 25° C. for 60 minutes. The resultant mixture was filtered and washed with water, thereby obtaining a paste of fine coloring particles. The paste of fine coloring particles was re-dispersed in ion-exchanged water, and then freeze-dried, thereby obtaining fine coloring particles.

It was conformed that the obtained fine coloring particles had an average primary particle diameter thereof in a dried state of 6 nm, an average particle diameter of the flocculate thereof of 21 nm, a BET specific surface area value of 178.8 $m^2$/g, a light transmittance of 92.1% and a tinting strength of 139%. As to the hue of the fine coloring particles, the L* value thereof was 18.14; the a* value thereof was 11.14; the b* value thereof was −25.64; and the C* value thereof was 27.96.

<Production of Water-Based Dispersion>

18.0 g of the paste of functional material (solid content: 6 g) obtained after the water-washing, 41.1 g of ion-exchanged water, 0.7 g of a dispersant (mixture of polyacrylic acid and styrene-maleic acid copolymer (=8:2)) and 0.2 g of a defoaming agent (silicone-based defoaming agent) were charged together with 150 g of 1.5 mmφ glass beads into a 220 ml glass bottle, and then mixed and dispersed for one hour using a paint shaker, thereby obtaining a water-based dispersion.

It was confirmed that the obtained water-based dispersion containing the functional material had a concentration of 10.3% by weight, an average particle diameter of 4 nm, a dispersion stability of the rank 5, a percentage of change in dispersed particle diameter of 3.2%, and a light transmittance of 94%.

<Production of Solvent-Based Dispersion>

The paste of functional material obtained after the water-washing was charged into a kneader, and kneaded with toluene at the following mixing ratio. After removing separated water, the kneader was closed, and the inside pressure thereof was reduced to about 30 mmHg while heating to 60° C. to remove water therefrom, thereby obtaining a solvent-based dispersion.

Paste of functional material

| Paste of functional material (solid content: 40% by weight) | 100 parts by weight |
|---|---|
| Solvent (toluene) | 60 parts by weight |

It was confirmed that the obtained solvent-based dispersion containing the fine coloring particles had a concentration of 66.5% by weight and a light transmittance of 80.6%.

Use Example 1

Production of Resin Composition 0.5 g of the fine coloring particles and 49.5 g of polyvinyl chloride resin particles ("103EP8D" (tradename), produced by NIPPON ZEON CO., LTD.) were weighed and charged into a 100 ml plastic beaker, and intimately mixed together by a spatula, thereby obtaining mixed particles.

1.0 g of calcium stearate was added to the obtained mixed particles. The resultant mixture was intimately mixed and then slowly supplied to hot rolls heated to 160° C. whose clearance was set to 0.2 mm, and continuously kneaded therebetween until a uniform resin composition was produced. The resin composition kneaded was separated from the hot rolls and used as a raw material for forming a colored resin plate. Next, the thus-produced resin composition was interposed between a pair of surface-polished stainless steel plates, placed within a hot press heated to 180° C. and then subjected to a pressure molding while applying a pressure of 98,000 kPa (1 ton/cm$^2$) thereto, thereby obtaining a colored resin plate having a thickness of 1 mm.

It was confirmed that as to the hue of the obtained colored resin plate, the L* value thereof was 19.51, the a* value thereof was 9.54, the b* value thereof was −25.68, and the C* value thereof was 27.39, and that the colored resin plate had a dispersing condition of the rank 5 and a light transmittance of 92%.

Use Example 2

Production of Ink-Let Printing Ink

The water-based dispersion and the following raw materials were mixed with each other under stirring, and the resultant mixture was filtered using a 0.5 μm membrane filter, thereby obtaining an ink-jet printing ink.

| Water-based dispersion | 10.0 parts by weight |
|---|---|
| Diethylene glycol | 2.0 parts by weight |
| Ion-exchanged water | 8.0 parts by weight |

It was confirmed that the obtained ink-jet printing ink had a dispersed particle diameter in ink of 20 nm, a dispersion stability by visual observation of the rank 5, and a percentage of change in dispersed particle diameter of 2.5%. As to the hue of the ink-jet printing ink, the L* value thereof was 19.13, the a* value thereof was 9.08, the b* value thereof was −24.48, and the C* value thereof was 26.11.

<Inorganic Compound Particles>

Inorganic compound particles 1 to 4 having properties shown in Table 1 were prepared.

<Organic Pigments>

Organic pigments having properties shown in Table 2 were prepared.

<Production of Composite Particles>

Composite Particles 1 to 4:

The same procedure as defined in Example 1 was conducted except that kinds of inorganic compound particles, kinds and amounts of gluing agent added, linear load and treating time used in the coating step with gluing agent, kinds and amounts of organic pigments adhered, and linear load and treating time used in organic pigment-adhering step were changed variously, thereby obtaining composite particles.

The essential production conditions are shown in Table 3, and various properties of the obtained composite particles are shown in Table 4.

Examples 2 to 4 and Comparative Examples 1 and 2

<Production of Functional Material>

The same procedure as defined in Example 1 was conducted except that kinds of composite particles, kind and amount of dissolving solution, and dissolution treatment temperature were changed variously, thereby obtaining a functional material. Meanwhile, the amount of the composite particles added is expressed by "part by weight" based on 100 ml of the dissolving solution.

The essential production conditions are shown in Table 5, and various properties of the obtained functional material are shown in Table 6.

Examples 5 to 10 and Comparative Examples 3 to 8

<Dispersion Containing Functional Material>

The same procedure as defined in Example 1 was conducted except that kinds of functional material, and kinds and amounts of solvents added as water-based pigment dispersion base material, were changed variously, thereby obtaining dispersions.

The essential production conditions and various properties of the obtained dispersions containing the functional material are shown in Table 7.

Use Examples 3 to 5 and Comparative Use Examples 1 to 6

<Resin Composition>

The same procedure as defined in Use Example 1 was conducted except that kinds of functional material were changed variously, thereby obtaining resin compositions.

The essential production conditions and various properties of the obtained resin compositions are shown in Table 8.

Use Examples 6 to 8 and Comparative Use Examples 7 to 12

<Production of Ink-Jet Printing Ink>

The same procedure as defined in Use Example 2 was conducted except that kinds of dispersions containing functional material were changed variously, thereby obtaining ink-jet printing inks.

The essential production conditions and various properties of the obtained ink-jet printing inks are shown in Table 9.

TABLE 1

| | Properties of inorganic compound particles | | | |
|---|---|---|---|---|
| Core particles | Kind | Shape | Average particle diameter (μm) | BET specific surface area value (m$^2$/g) |
| Core particles 1 | Magnetite | Spherical | 0.230 | 11.8 |
| Core particles 2 | Zinc oxide | Granular | 0.183 | 18.3 |
| Core particles 3 | Calcium carbonate | Granular | 0.140 | 18.6 |
| Core particles 4 | Silica | Granular | 0.021 | 196.2 |

TABLE 2

| | | | | | Properties of organic pigments | | | | |
|---|---|---|---|---|---|---|---|---|---|
| | | | | | | Hue | | | |
| Organic pigments | Kind | Shape | Average particle diameter (μm) | BET specific surface area value (m$^2$/g) | Light transmittance (%) | L* value (—) | a* value (—) | b* value (—) | C* value (—) |
| Organic pigments B | Pigment Blue (phthalocyanine-based pigment) | Granular | 0.06 | 71.6 | 71.0 | 17.70 | 9.72 | −23.44 | 25.38 |
| Organic pigments G | Pigment Green (phthalocyanine-based pigment) | Granular | 0.06 | 60.5 | 59.7 | 21.83 | −18.31 | −7.36 | 19.73 |
| Organic pigments R | Pigment Red (quinacridone-based pigment) | Granular | 0.58 | 19.3 | 74.9 | 36.99 | 51.88 | 20.57 | 55.81 |
| Organic pigments Y | Pigment Yellow (azo-based pigment) | Granular | 0.73 | 10.5 | 34.5 | 66.80 | 0.78 | 70.92 | 70.92 |

TABLE 3

| | | Production of composite particles | | | | | | | | | |
|---|---|---|---|---|---|---|---|---|---|---|---|
| | | Coating step with gluing agent | | | | | Adhesion step with organic pigments | | | | |
| | | Additives | | Edge runner treatment | | Coating amount | Organic pigments | | Edge runner treatment | | Amount adhered |
| Composite particles | Kind of core particles | Kind | Amount added (wt. part) | Linear load (N/cm) | Linear load (Kg/cm) | Time (min) | (calculated as C) (wt. %) | Kind | Amount added (wt. part) | Linear load (N/cm) | Linear load (Kg/cm) | Time (min) | (calculated as C) (wt. %) |
| Composite particles 1 | Core particles 1 | Methyl tri-ethoxysilane | 6.0 | 441 | 45 | 30 | 0.38 | G | 20.0 | 392 | 40 | 60 | 5.94 |
| Composite particles 2 | Core particles 2 | Polyvinyl alcohol | 5.0 | 588 | 60 | 20 | 2.56 | R | 30.0 | 588 | 60 | 30 | 17.61 |
| Composite particles 3 | Core particles 3 | γ-amino-propyl tri-ethoxysilane | 2.0 | 294 | 30 | 20 | 0.31 | Y | 50.0 | 588 | 60 | 60 | 18.77 |
| Composite particles 4 | Core particles 4 | Methyl tri-ethoxysilane | 0.005 | 588 | 60 | 20 | 3 × 10$^{-4}$ | B | 100.0 | 588 | 60 | 60 | 33.16 |

TABLE 4

| Composite particles | Properties of composite particles | | |
|---|---|---|---|
| | Average particle diameter (μm) | BET specific surface area value (m²/g) | Degree of desorption of organic pigments (-) |
| Composite particles 1 | 0.231 | 7.6 | 5 |
| Composite particles 2 | 0.184 | 13.6 | 5 |
| Composite particles 3 | 0.142 | 11.3 | 5 |
| Composite particles 4 | 0.021 | 124.1 | 2 |

TABLE 5

| | Production of functional material | | | | | |
|---|---|---|---|---|---|---|
| | Composite particles | | Dissolving solution | | | |
| Examples and Comparative Examples | Kind | Amount added (wt. part) | Kind | Concentration (mol/l) | Ratio to stoichiometric amount (-) | Treating temp. (° C.) |
| Example 2 | Composite particles 1 | 10.0 | Oxalic acid | 4.5 | 3.5:1 | 25 |
| Example 3 | Composite particles 2 | 10.0 | Hydrochloric acid | 3.0 | 1.7:1 | 25 |
| Example 4 | Composite particles 3 | 10.0 | Hydrochloric acid | 3.0 | 3.0:1 | 25 |
| Comparative Example 1 | Particles obtained in Example 1 | 10.0 | Hydrofluoric acid | 2.5 | 0.8:1 | 25 |
| Comparative Example 2 | Composite particles 4 | 10.0 | Hydrofluoric acid | 5.5 | 1.7:1 | 25 |

TABLE 6

| | Properties of functional material | | | | | | | | |
|---|---|---|---|---|---|---|---|---|---|
| Examples and Comparative Examples | Average primary particle diameter of fine coloring particles in a dried state (nm) | Average particle diameter of flocculate thereof (nm) | BET specific surface area value (m²/g) | Hue | | | | Tinting strength (%) | Light transmittance (%) |
| | | | | L* value (-) | a* value (-) | b* value (-) | C* value (-) | | |
| Example 2 | 9 | 38 | 113.2 | 22.16 | −19.64 | −8.64 | 21.46 | 126 | 92.7 |
| Example 3 | 7 | 29 | 121.6 | 38.04 | 53.64 | 22.63 | 58.22 | 128 | 95.3 |
| Example 4 | 10 | 44 | 131.2 | 68.32 | 2.68 | 73.64 | 73.69 | 131 | 90.5 |
| Comparative Example 1 | 109 | 452 | 42.7 | 18.96 | 8.73 | −21.14 | 22.87 | 97 | 68.9 |
| Comparative Example 2 | 315 | 1,107 | 28.4 | 18.43 | 8.41 | −20.52 | 22.18 | 94 | 65.4 |

TABLE 7

| | Production of dispersion containing functional material | | | | Properties of dispersion containing functional material | | | | |
|---|---|---|---|---|---|---|---|---|---|
| | Fine particles | | Solvent | | | | | Percentage | |
| Examples and Comparative Examples | Kind | Amount added (wt. part) | Kind | Amount added (wt. part) | Concentration (wt. %) | Dispersed particle diameter (nm) | Visual observation (-) | of change in dispersed particle diameter (%) | Light transmittance (%) |
| Example 5 | Example 2 | 11.1 | Water | 98.3 | 10.2 | 15 | 5 | 3.9 | 81.2 |
| Example 6 | Example 3 | 11.1 | Water | 98.3 | 10.1 | 12 | 5 | 4.3 | 83.3 |
| Example 7 | Example 4 | 11.1 | Water | 98.3 | 10.1 | 22 | 4 | 3.6 | 80.5 |
| Example 8 | Example 2 | 66.7 | Toluene | 100.0 | 67.0 | — | — | — | 81.4 |
| Example 9 | Example 3 | 53.8 | Toluene | 100.0 | 54.2 | — | — | — | 83.2 |
| Example 10 | Example 4 | 100.0 | Toluene | 100.0 | 100.3 | — | — | — | 80.8 |

TABLE 7-continued

| | Production of dispersion containing functional material | | | | Properties of dispersion containing functional material | | | |
|---|---|---|---|---|---|---|---|---|
| | Fine particles | | Solvent | | | | | |
| Examples and Comparative Examples | Kind | Amount added (wt. part) | Kind | Amount added (wt. part) | Concentration (wt. %) | Dispersed particle diameter (nm) | Visual observation (−) | Percentage of change in dispersed particle diameter (%) | Light transmittance (%) |
| Comparative Example 3 | Organic pigment B | 11.1 | Water | 98.3 | 10.3 | 226 | 1 | 17.8 | 18.0 |
| Comparative Example 4 | Organic pigment G | 11.1 | Water | 98.3 | 10.1 | 214 | 1 | 18.9 | 19.5 |
| Comparative Example 5 | Organic pigment R | 11.1 | Water | 98.3 | 10.2 | 382 | 1 | 17.5 | 14.8 |
| Comparative Example 6 | Organic pigment Y | 11.1 | Water | 98.3 | 10.1 | 962 | 1 | 21.8 | 13.2 |
| Comparative Example 7 | Comparative Example 1 | 11.1 | Water | 98.3 | 10.2 | 312 | 2 | 12.4 | 20.3 |
| Comparative Example 8 | Comparative Example 2 | 11.1 | Water | 98.3 | 10.3 | 218 | 1 | 17.6 | 22.6 |

TABLE 8

| Use Examples and Comparative Use Examples | Production of resin composition Kind of functional material | Properties of resin composition Dispersing condition (−) | Properties of resin composition | | | | |
|---|---|---|---|---|---|---|---|
| | | | Hue | | | | Light transmittance (%) |
| | | | L* value (−) | a* value (−) | b* value (−) | C* value (−) | |
| Use Example 1 | Example 2 | 5 | 24.58 | −18.36 | −7.95 | 20.01 | 91.8 |
| Use Example 2 | Example 3 | 5 | 41.17 | 51.41 | 21.05 | 55.55 | 92.0 |
| Use Example 3 | Example 4 | 4 | 70.94 | 2.04 | 71.88 | 71.91 | 90.1 |
| Comparative Use Example 1 | Organic pigment B | 2 | 20.01 | 10.04 | −22.89 | 25.00 | 70.2 |
| Comparative Use Example 2 | Organic pigment G | 2 | 23.56 | −17.65 | −6.73 | 18.89 | 59.3 |
| Comparative Use Example 3 | Organic pigment R | 2 | 39.42 | 50.46 | 19.60 | 54.13 | 73.6 |
| Comparative Use Example 4 | Organic pigment Y | 2 | 69.15 | 0.67 | 69.94 | 69.94 | 35.2 |
| Comparative Use Example 5 | Comparative Example 1 | 2 | 21.23 | 8.03 | −20.76 | 22.26 | 66.2 |
| Comparative Use Example 6 | Comparative Example 2 | 2 | 21.04 | 8.21 | −20.13 | 21.74 | 66.9 |

TABLE 9

| | Production of ink-jet printing ink | | Properties of ink-jet printing ink | | | | | | | |
|---|---|---|---|---|---|---|---|---|---|---|
| | Dispersion containing functional material | | | Dispersion stability | | | | | | |
| Use Examples and Comparative Use Examples | Kind | Amount blended (wt. part) | Dispersed particle diameter (nm) | Visual observation (−) | Percentage of change in dispersed particle diameter (%) | Hue | | | | |
| | | | | | | L* value (−) | a* value (−) | b* value (−) | C* value (−) | |
| Use Example 4 | Example 2 | 10.0 | 16 | 5 | 3.6 | 22.34 | −19.41 | −8.33 | 21.12 | |
| Use Example 5 | Example 3 | 10.0 | 12 | 5 | 4.0 | 38.15 | 53.02 | 21.94 | 57.38 | |

TABLE 9-continued

| | Production of ink-jet printing ink | | Properties of ink-jet printing ink | | | | | |
| --- | --- | --- | --- | --- | --- | --- | --- | --- |
| | Dispersion containing functional material | | | Dispersion stability | | | | |
| | | | | Percentage of change | | | | |
| Use Examples | | Amount | Dispersed | Visual | in dispersed | Hue | | | |
| and Comparative Use Examples | Kind | blended (wt. part) | particle diameter (nm) | observation (—) | particle diameter (%) | L* value (—) | a* value (—) | b* value (—) | C* value (—) |
| Use Example 6 | Example 4 | 10.0 | 21 | 5 | 3.2 | 69.27 | 2.24 | 72.86 | 72.89 |
| Comparative Use Example 7 | Organic pigment B | 10.0 | 251 | 1 | 16.4 | 19.54 | 8.72 | −21.82 | 23.50 |
| Comparative Use Example 8 | Organic pigment G | 10.0 | 243 | 1 | 18.0 | 23.61 | −17.18 | −5.39 | 18.01 |
| Comparative Use Example 9 | Organic pigment R | 10.0 | 404 | 1 | 16.9 | 39.03 | 49.26 | 18.47 | 52.61 |
| Comparative Use Example 10 | Organic pigment Y | 10.0 | 980 | 1 | 21.1 | 69.76 | 0.44 | 67.58 | 67.58 |
| Comparative Use Example 11 | Comparative Example 1 | 10.0 | 328 | 2 | 12.2 | 19.93 | 7.23 | −20.41 | 21.65 |
| Comparative Use Example 12 | Comparative Example 2 | 10.0 | 235 | 2 | 16.8 | 19.72 | 7.38 | −19.96 | 21.28 |

What is claimed is:

1. A functional material having a dispersed particle diameter of not more than 0.1 μm and comprising fine coloring particles having an average primary particle diameter of 1 to 50 nm in a dried state, and having a BET specific surface area value of 30 to 500 m²/g, a tinting strength of not less than 110% as measured by the following method:

(1) applying a primary color enamel
   prepared by blending together 10 g of primary color particles, 16 g of an amino alkyd resin and 6 g of a thinner, adding 90 g of 3 mmϕ glass beads to the mixture into a 140-ml glass bottle, mixing and dispersing the glass beads in the mixture for 45 minutes in a paint shaker, mixing the obtained mixture with 50 g of an amino alkyd resin, and dispersing same for 5 minutes in a paint shaker and a vehicle enamel
   prepared by blending together 12 g of the primary color enamel and 40 g of titanium dioxide-dispersed amino alkyd resin and mixing and dispersing the resultant mixture for 15 minutes by a paint shaker
respectively on a cast-coated paper by a 150 μm (6-mil) applicator to produce coating film pieces, (2) measuring the thus obtained coating film pieces by a multi-spectro-color-meter to determine L* values thereof, the difference between the obtained L* values represented by a ΔL* value, next (3) preparing a standard functional material consisting of organic pigment that is used for the production of the functional material, to prepare an primary color enamel and a vehicle enamel, (4) forming coating film pieces and measuring L* values thereof, (5) determining the difference between the L* values as represented by a ΔLs* value, then (6) calculating the obtained ΔL* value of the colorant and ΔLs* value of the standard functional material and determining the tinting strength (%) according to the following formula:

Tinting strength (%)=100+{(ΔLs*−ΔL*)×10} and a light transmittance of not less than 80% when evaluated by the following method:

(1) blending 5 g of the functional material and the following components as a paint base material at the below-mentioned mixing ratio in a 250 ml glass bottle, and mixing and dispersing the resultant mixture together with 160 g of 3 mmϕ glass beads using a paint shaker for 120 minutes, thereby preparing a paint:

| | |
| --- | --- |
| Functional material | 9.9 parts by weight |
| Melamine resin | 19.8 parts by weight |
| Alkyd resin | 39.6 parts by weight |
| Xylene | 29.7 parts by weight |
| Butanol | 1.0 part by weight; |

(2) applying the thus prepared paint onto a 100 μm-thick clear film to form a coating film having a thickness of 150 μm thereon; and (3) measuring a light transmittance of the obtained coating film in a wavelength region of 380 to 700 nm using a self-recording photoelectric spectrophotometer where the functional material is prepared by a process comprising: mixing inorganic compound particles with a gluing agent under stirring to form a gluing agent coat on surface of the inorganic compound particles;

adding organic pigments to the inorganic compound particles coated with the gluing agent, and mixing the resultant mixture under stirring to adhere the organic pigments on the gluing agent coat, thereby obtaining composite particles; and dissolving the inorganic compound particles only or both of the inorganic compound particles and the gluing agent from the composite particles.

2. A functional material according to claim 1, wherein said functional material has an average particle diameter of 1 to 150 nm and a tinting strength of not less than 115%.

3. A dispersion comprising:
   the functional material as defined in claim 1; and
   a dispersion base material comprising water, a mixture of water and a water-soluble organic solvent, or an organic solvent, said functional material being contained in an amount of 5 to 1,000 parts by weight based on 100 parts by weight of the dispersion base material.

4. A dispersion according to claim 3 which has a light transmittance of not less than 60%.

5. A resin composition comprising:

the functional material as defined in claim 1; and a thermoplastic resin, said functional material being contained in an amount of 0.01 to 200 parts by weight based on 100 parts by weight of the thermoplastic resin.

6. An ink-jet printing ink comprising:

the functional material as defined in claim 1; and an ink base solution comprising a dispersant and water, said functional material being contained in an amount of 1 to 20% by weight based on the weight of the ink base solution.

* * * * *